(12) United States Patent
Obata et al.

(10) Patent No.: US 11,179,958 B2
(45) Date of Patent: Nov. 23, 2021

(54) PRINTED MATTER, PRINTED-MATTER MANAGEMENT DEVICE, INFORMATION OUTPUT SYSTEM, AND PAGE IDENTIFICATION METHOD FOR PRINTED MATTER

(71) Applicant: TOPPAN PRINTING CO., LTD., Tokyo (JP)

(72) Inventors: Koichi Obata, Tokyo (JP); Koichi Yoshino, Tokyo (JP)

(73) Assignee: TOPPAN PRINTING, CO., LTD., Tokyo (JP)

( * ) Notice: Subject to any disclaimer, the term of this patent is extended or adjusted under 35 U.S.C. 154(b) by 552 days.

(21) Appl. No.: 16/141,484

(22) Filed: Sep. 25, 2018

(65) Prior Publication Data

US 2019/0025963 A1    Jan. 24, 2019

Related U.S. Application Data

(63) Continuation of application No. PCT/JP2017/013225, filed on Mar. 30, 2017.

(30) Foreign Application Priority Data

Apr. 1, 2016    (JP) .............................. JP2016-074397

(51) Int. Cl.
*G06F 3/044*     (2006.01)
*B42D 15/00*    (2006.01)
(Continued)

(52) U.S. Cl.
CPC .......... *B42D 1/007* (2013.01); *B42D 15/0093* (2013.01); *G06F 13/00* (2013.01); *G06F 2203/04103* (2013.01)

(58) Field of Classification Search
CPC ........... G06F 2203/04103; G06F 3/044; G06F 2203/041
See application file for complete search history.

(56) References Cited

U.S. PATENT DOCUMENTS 6,021,306 A * 2/2000 McTaggart ................ B42C 9/00
434/317
8,181,848 B2 5/2012 Olmsted et al.
(Continued)

FOREIGN PATENT DOCUMENTS

JP    H06-348400 A    12/1994
JP    2000-276283 A    10/2000
(Continued)

OTHER PUBLICATIONS

International Search Report regarding Int'l. Application No. PCT/JP2017/013225, dated May 16, 2017, 2 pps.
(Continued)

*Primary Examiner* — MD Saiful A Siddiqui
(74) *Attorney, Agent, or Firm* — Foley & Lardner LLP

(57) ABSTRACT

Printed matter including a viewed-page detection electrode provided to a primary surface of a first printed medium among a plurality of bound printed media, the viewed-page detection electrode being so disposed that, when the printed matter is closed, at least part of the electrode provided to a first page overlaps with an electrode provided to a second page facing the first page; a selected-area detection electrode provided to the primary surface and located at a position different from the viewed-page detection electrode; a first determination unit connected to the viewed-page detection electrode to determine a page that is currently open based on capacitance generated in the viewed-page detection electrode; and a second determination unit connected to the selected-area detection electrode to determine whether the selected-area detection electrode of the open page has been
(Continued)

touched by a user based on capacitance generated in the selected-area detection electrode.

9 Claims, 13 Drawing Sheets

(51) Int. Cl.
*B42D 1/00* (2006.01)
*G06F 13/00* (2006.01)

(56) References Cited

U.S. PATENT DOCUMENTS

| | | | |
|---|---|---|---|
| 2005/0082820 A1* | 4/2005 | Nelson | B42D 3/123 283/83 |
| 2007/0298398 A1* | 12/2007 | Smirnov | A63H 33/38 434/309 |
| 2011/0272260 A1 | 11/2011 | Wallace et al. | |
| 2012/0176789 A1* | 7/2012 | Van Herpen | F21S 4/22 362/234 |
| 2013/0118883 A1 | 5/2013 | Wallace et al. | |
| 2013/0316321 A1* | 11/2013 | Herz | G09B 5/062 434/317 |
| 2015/0242185 A1* | 8/2015 | Stone | A63H 33/38 345/174 |

FOREIGN PATENT DOCUMENTS

| | | | |
|---|---|---|---|
| JP | 2004-130658 | * | 4/2004 |
| JP | 2004-14553 | * | 5/2004 |
| JP | 2009-507301 A | | 2/2009 |
| JP | 2013-542473 A | | 11/2013 |
| JP | 2016-533562 A | | 10/2016 |

OTHER PUBLICATIONS

Office Action and English translation of Office Action regarding Japanese Application No. 2017-536976, dated Apr. 3, 2018, 4 pps.
Touch Sensor Printed on Paper with Silver Ink, Telescope Magazine, dated Feb. 16, 2015, 2 pps. (English translation of reference in search report cited as: Gin no Ink de Touch Sensor o Kami ni Insatsu, [online], Internet: <URL:http://www.tel.co.jp/museum/magazine/news/160.html>, dated Feb. 16, 2015, 1 pg.).
Japanese Office Action dated Oct. 16, 2018 in corresponding application No. 2017-536976.

* cited by examiner

FIG.16

| VIEWING-INFORMATION | PAGE | TOUCH | CONTENT |
|---|---|---|---|
| N1 | 1 | NONE | A |
| N2 | | E11 | B |
| N3 | 2 | NONE | C |
| N4 | | E21 | D |
| N5 | | E22 | E |
| ⋮ | ⋮ | ⋮ | ⋮ |

PRINTED MATTER, PRINTED-MATTER MANAGEMENT DEVICE, INFORMATION OUTPUT SYSTEM, AND PAGE IDENTIFICATION METHOD FOR PRINTED MATTER

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/013225, filed on Mar. 30, 2017, which is based upon and claims the benefit of priority to Japanese Patent Application No. 2016-074397, filed on Apr. 1, 2016, the disclosures of which are all hereby incorporated herein by reference in their entireties.

TECHNICAL FIELD

The present invention relates to printed matter or a printed matter device, a printed-matter management device, an information output system, and a page identification method for printed matter.

BACKGROUND

Augmented Reality (AR) technology is used today as a method of directly linking software on a computer with a printed medium. In AR technology, the computer is permitted to recognize a print surface as an image and give a real-time presentation of the information corresponding to the recognition by using software. Such a method is widely used as an effective method of presenting information, a method that takes advantage of both digital and analog processes without the need of mounting a special device to a printed medium. For example, this technology is used for presenting additional information, such as still or moving images, related to the content of a printed medium by use of software to supplement information in the content of the printed medium. This technology, however, forces the user to suffer the inconvenience of operating a computer, for image recognition of the print surface. In addition, since printed matter is recognized with a camera, lighting environments and the posture or the position of the user are restricted.

For example, PTL 1 discloses that, in a circumstance where a radio-frequency identification (RFID) tag is added to each of a plurality of leaflets bound as printed media and where one leaflet is opened by the user, the photosensor related to the tag makes the rest of the RFID tags of the leaflets inactive to enable linkage of the printed medium with the RF sensor.

A possible method of achieving direct linkage between a printed medium and a computer may be to mount a sensor to the printed medium. If an electrode is disposed to each paper surface of the printed media, the contact state of the electrode changes conforming to the opening/closing of the page, which enables recognition of the opening/closing of the page.

CITATION LIST

Patent Literature

PTL 1: JP 2009-507301 A

SUMMARY OF THE INVENTION

However, the detection method based such as on electrical connection/disconnection between electrodes may result in detecting a plurality of disconnection points. This may occur when there is a small space between the open page and the previous or the following page, or when the user inserts his/her finger into a page that is not opened during operation. In such a situation, it is difficult to detect the page that is actually viewed by the user. The user's operation of selecting a specific area of a page may be detected by providing a touch-sensor electrode on each paper surface. However, since there may be a large number of pages, the electrodes provided to the respective pages may interfere with one another, and an accurate value is unlikely to be acquired. It is thus needed to provide a method that can be embedded beneath the print surface of a page, and which can accurately detect opening/closing of a page and a touch on the page.

The present invention has been made in light of the above circumstances, and provides printed matter, a printed-matter management device, an information output system, and a page identification method for printed matter, which is able to more accurately detect the page number of a printed medium viewed by the user and the user's operation of selecting a specific area of the page, which is given versatility applicable to the existing printed media, and which detects the user's state of viewing bookbound printed media and performs computer processing using the printed media.

[Intended Solution to Problem]

An aspect of the present invention is printed matter including: a viewed-page detection electrode provided to a first primary surface of a first printed medium among a plurality of printed media bound as the printed matter, the viewed-page detection electrode being so disposed that, in a state where the printed matter has been closed, at least part of the electrode provided to a first page of the first printed medium overlaps with an electrode provided to a second page of a second printed medium facing the first page; a selected-area detection electrode provided to the primary surface so as to be located at a position different from that of the viewed-page detection electrode; a first determination unit connected to the viewed-page detection electrode to determine a page that is currently open among the plurality of printed media, based on capacitance generated in the viewed-page detection electrode; and a second determination unit connected to the selected-area detection electrode to determine whether the selected-area detection electrode of the open page of the printed medium has been touched by a user, based on capacitance generated in the selected-area detection electrode in a state where the printed matter is open.

An aspect of the present invention is the printed matter described above. In the printed matter, at least either of the viewed-page detection electrode and the selected-area detection electrode is formed by printing.

An aspect of the present invention is the printed matter described above. In the printed matter, in a state where the printed matter has been closed, the viewed-page detection electrode provided to the first page of the first printed medium is disposed so as not to overlap with an electrode provided to a third page of a third printed medium not facing the first page of the first printed medium.

An aspect of the present invention is the printed matter described above. In the printed matter, the second determination unit determines that selected-area detection electrodes disposed to other pages than the open page determined to have been open by the first determination unit have not been touched by the user.

An aspect of the present invention is the printed matter described above. In the printed matter, a printed medium having printed content is bonded to at least part of the selected-area detection electrode.

An aspect of the present invention is the printed matter described above. In the printed matter, a booklet part including the plurality of printed media can be separated from an electronic circuit part including the first determination unit and the second determination unit.

An aspect of the present invention is the printed matter described above. In the printed matter, the electronic circuit part is a sticker electrode bonded to an exterior, which is additionally provided to the booklet part, and bonded to the plurality of printed media.

An aspect of the present invention is the printed matter described above. In the printed matter, the second determination unit is a grid electrode provided to a rear surface of a cover sheet of the booklet part or to the plurality of printed media of the booklet part.

An aspect of the present invention is a printed-matter management device including a reception unit receiving radio waves from a communication circuit of the printed matter described above; and an identification information input unit acquiring page identification information corresponding to an open page of the printed matter, based on a reception signal of the received radio waves.

An aspect of the present invention is the printed-matter management device described above. The device includes a content storage unit storing the page identification information and content; and an output unit outputting content corresponding to the acquired page identification information.

An aspect of the present invention is an information output system including the printed matter management device described above and an information output device. In the system, the information output device includes a reception unit receiving content transmitted from the printed matter management device, and a content output unit outputting the content.

An aspect of the present invention is a method of identifying a page of printed matter, the printed matter including: a viewed-page detection electrode provided to a primary surface of a first printed medium among a plurality of printed media bound as the printed matter, the viewed-page detection electrode being so disposed that, in a state where the printed matter has been closed, at least part of the electrode provided to a first page of the first printed medium overlaps with an electrode provided to a second page of a second printed medium facing the first page; a selected-area detection electrode provided to the primary surface so as to be located at a position different from that of the viewed-page detection electrode. The method includes: determining a page that is currently open among the plurality of printed media, based on capacitance generated in the viewed-page detection electrode, as decided by a first determination unit connected to the viewed-page detection electrode; and determining whether the selected-area detection electrode of the open page has been touched by a user, based on capacitance generated in the selected-area detection electrode in a state where the printed matter is open, as decided by a second determination unit connected to the selected-area detection electrode.

An aspect of the present invention is a wiring structure including a grid electrode provided to a rear surface of a cover sheet of the booklet part or to the plurality of printed media of the booklet part, wherein the wiring structure determines whether a selected-area detection electrode provided to an open page of printed matter has been touched by a user, based on capacitance generated in the selected-area detection electrode in a state where the printed matter is open.

Desired Advantageous Effects of the Invention

According to an aspect of the present invention, printed matter includes a first determination unit connected to a viewed-page detection electrode to determine which page of printed media has been opened based on capacitance generated in the viewed-page detection electrode, and a second determination unit connected to a selected-area detection electrode to determine whether the selected-area detection electrode on the open page of the printed medium has been touched by the user, based on capacitance generated in the selected-area detection electrode in a state where the printed matter is open. With this configuration, the page number of a printed medium being viewed by the user and an operation of selecting a specific area of the page are detected with better and even high accuracy. Furthermore, the detection function described above is given improved versatility applicable to the existing printed media.

BRIEF DESCRIPTION OF THE DRAWINGS

FIG. 16 is a diagram illustrating an example of content stored in a content storage unit 314.

DESCRIPTION OF THE REPRESENTATIVE EMBODIMENT

Figure 1:
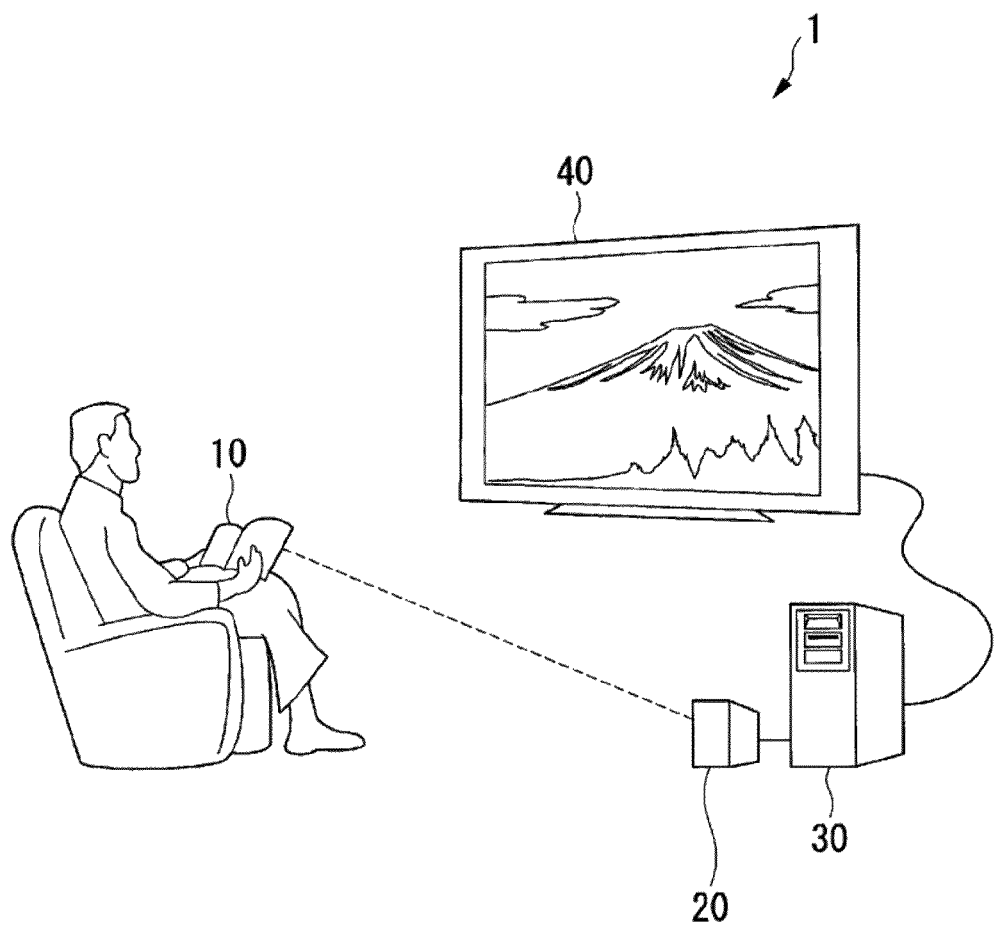
FIG. 1 is a schematic diagram illustrating a configuration of an information output system 1 according to an embodiment of the present invention.

With reference to the drawings, an information output system according to an embodiment of the present invention will be described. It is to be understood that the present invention is not limited to the following embodiment, which is intended to be representative of the present invention. The representative embodiment described below is merely an example of the present invention, and the design thereof could be appropriately changed by one skilled in the art. In the embodiment, the same or corresponding components are denoted by the same reference characters, and duplicate description thereof will be omitted.

FIG. 1 is a schematic diagram illustrating a configuration of an information output system 1 according to an embodiment of the present invention.

The information output system 1 includes an input device 10, a receiving device 20, an information management device 30, and an information output device 40. The receiving device 20 and the information management device 30 configure a printed matter management device.

The input device 10 is operated by the user. The input device 10 transmits individual identification information provided to a printed medium held by the user, detects the user's viewing information (page identification information and touch), and transmits a signal that contains page identification information. The input device 10 may also be termed printed matter hereinafter. The receiving device 20 transmits a signal to the input device 10 querying as to information transmission and receives radio waves transmitted from a communication circuit of the input device 10 in reply to the query. The information management device 30 outputs content to the information output device 40. The content corresponds to the page identification information of the radio waves received by the receiving device 20. The information output device 40 displays the content outputted from the information management device 30 on a screen or audibly outputs the content. The information output device 40 can be, for example, a display device, a lighting device, a projector, a speaker, a toy, or other machine devices.

A further description will be given of the information output system 1.

Figure 2A:
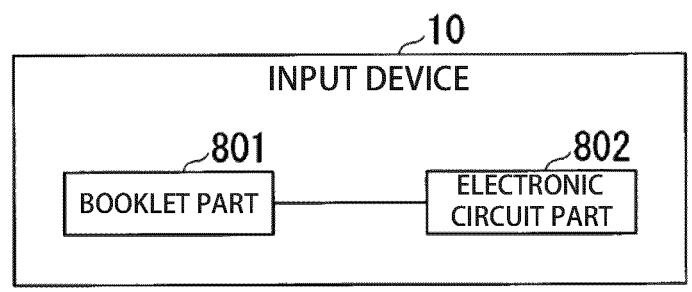
FIG. 2A is a schematic block diagram illustrating functions of an input device 10.
Figure 2B:
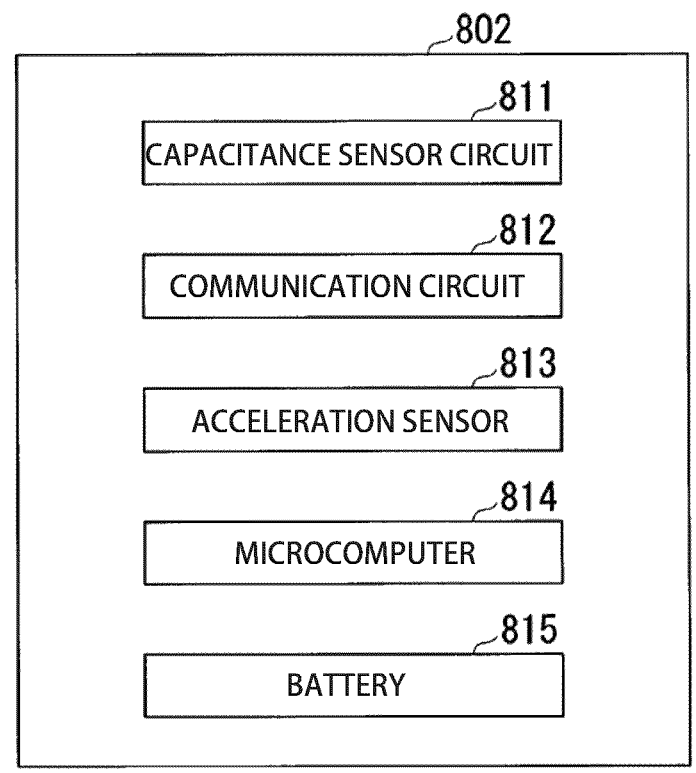
FIG. 2B is a schematic block diagram illustrating functions of an input device 10.

FIGS. 2A and 2B are schematic block diagrams illustrating functions of the input device 10. The input device 10 is mounted to bookbound printed matter. At least one input device 10 is provided to an item of printed matter, such as one input device per one item of printed matter. As shown in FIG. 2A, the input device 10 includes a booklet part 801 including a plurality of printed media, and an electronic circuit part 802 including a capacitance sensor circuit 811 (first determination unit and second determination unit). Alternatively, the input device 10 may be configured to include a booklet part 801, an electronic circuit part 802, and printed matter. Alternatively, it may be so configured that the printed matter includes a booklet part 801 and an electronic circuit part 802. Examples of the printed matter include books, magazines, brochures, catalogs, and ledger sheets.

As shown in FIG. 2B, the electronic circuit part 802 incorporates therein the capacitance sensor circuit 811, a communication circuit 812, an acceleration sensor 813, a microcomputer 814, a battery 815, and the like.

The electronic circuit part 802 is mounted to any portion of the printed matter, e.g., the cover sheet or the spine, excluding pages of the printed matter. The microcomputer 814 of each electronic circuit part 802 stores individual identification information that identifies the electronic circuit part 802 among a plurality of electronic circuit parts 802. With a capacitance detection technique being applied, the capacitance sensor circuit 811 of each electronic circuit part 802 detects page identification information, based on the capacitance generated in a viewed-page detection electrode and a selected-area detection electrode of the booklet part 801. The electronic circuit part 802 includes the communication circuit 812, and transmits a signal including individual identification information, page identification information, and selected-area identification information through the communication circuit 812. The acceleration sensor 813 calculates a reference value for use when the capacitance sensor circuit 811 makes a determination.

The viewed-page detection electrode and the selected-area detection electrode are provided to each page of the printed media, and are connected to the capacitance sensor circuit 811 of the electronic circuit part 802. Referring to FIGS. 3 to 10, a specific description will be given of installation of the viewed-page detection electrode, the selected-area detection electrode, and the capacitance sensor circuit 811.

Figure 3:
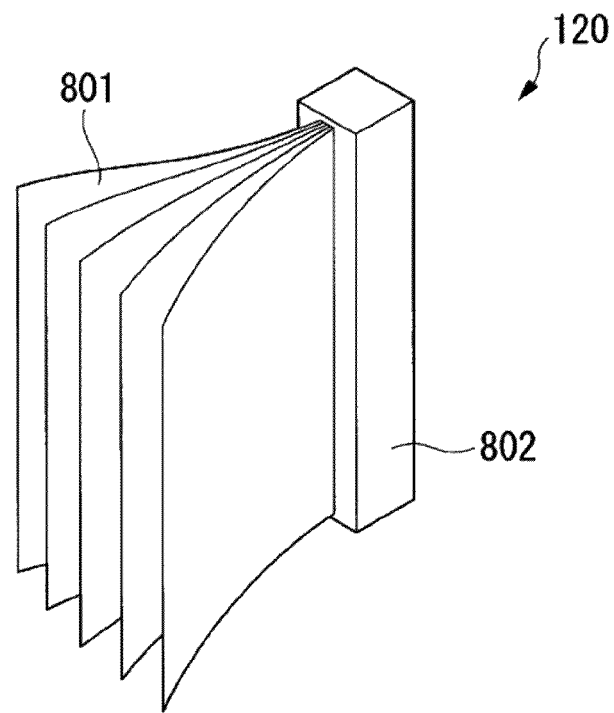
FIG. 3 is a schematic perspective view illustrating an appearance of printed matter 120.
Figure 4:
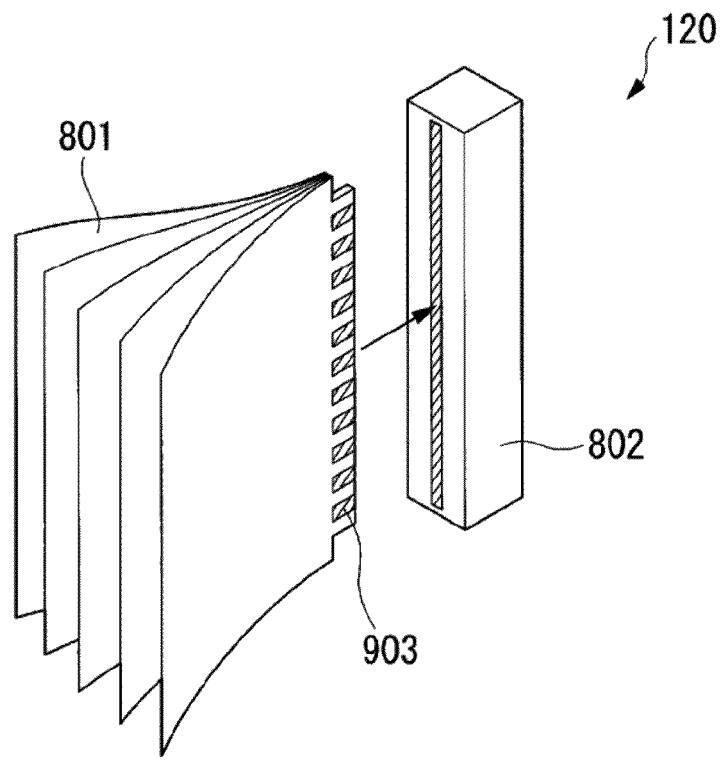
FIG. 4 is a schematic perspective view illustrating another example of an appearance of printed matter 120.

FIG. 3 is a schematic perspective view illustrating an appearance of printed matter 120. FIG. 4 is a schematic perspective view illustrating another example of an appearance of printed matter 120.

As shown in FIG. 3, the input device 10 is configured by a booklet part 801 and an electronic circuit part 802 installed on the spine of the booklet.

As shown in FIG. 4, the booklet part 801 and the electronic circuit part 802 may be separably mounted to the input device 10. In this case, a spine 903 of the booklet should be provided in the form of a connector, such as an edge connector, so as to be connectable to the electronic circuit part 802. Thus, the booklet part 801 of low manufacturing cost may be prepared for each item of content, while the electronic circuit part 802 of high manufacturing cost may be reused.

Figure 5:
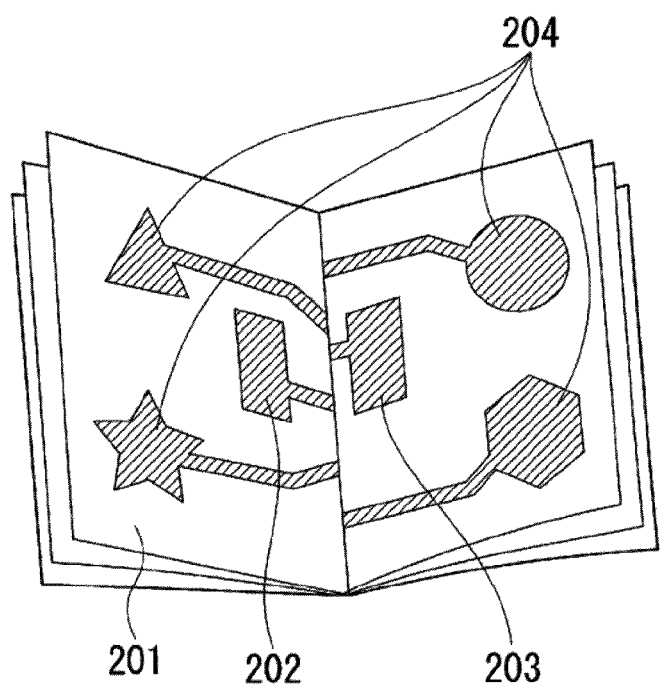
FIG. 5 is a perspective view illustrating a configuration example of electrodes disposed to a printed medium of an input device 10.

FIG. 5 is a perspective view illustrating a configuration example of electrodes disposed to a printed medium of the input device 10.

Viewed-page detection electrodes 202 and 203 and selected-area detection electrodes 204 for detecting a touch operation on a specific area are disposed to a printed medium 201. These electrodes have wiring extending to the spine, for connection to respective terminals of the capacitance sensor circuit 811. These electrodes and the wiring are provided on a first primary surface of the printed medium 201, such as paper or a PET film, by printing using an electrically conductive ink.

The viewed-page detection electrodes 202 and 203 are disposed to every pair of opposing pages so as to be located on the respective pages and at least partially overlap with each other when these pages are closed.

Figure 6:
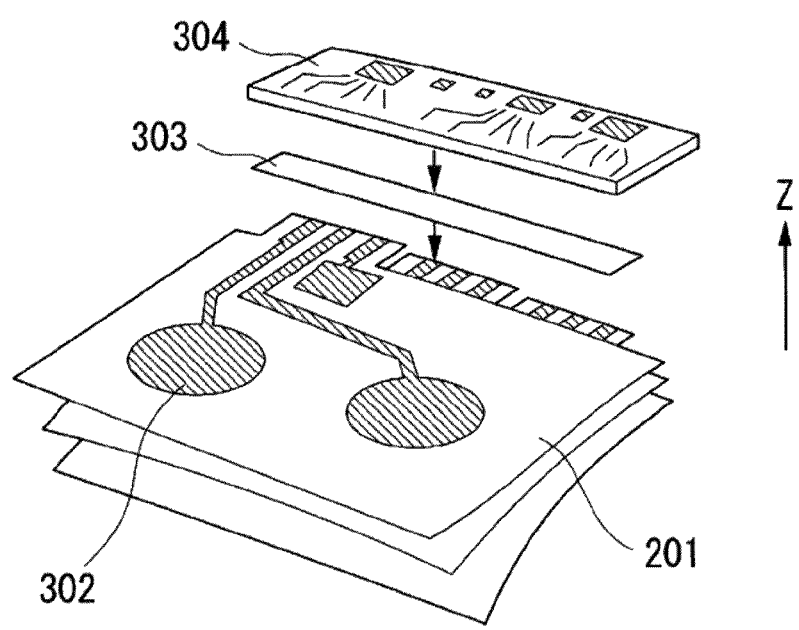
FIG. 6 is a perspective view illustrating an example of electrodes disposed to a printed medium of an input device 10.

FIG. 6 is a perspective view illustrating an example of electrodes disposed to a printed medium of the input device 10.

To connect electrodes 302 (viewed-page detection electrodes 202 and 203, and selected-area detection electrode 204) disposed to each printed medium 201 to a touch sensor circuit board 304 configuring the capacitance sensor circuit 811, terminals are disposed for each page so as not to overlap with each other, and bonded using a double-sided tape 303 that is conducted only in the Z-axis direction (thickness direction of the printed matter). Contact points between the electrodes and the terminals may be adhered by use of a conductive adhesive or by pressure bonding. The terminals of the touch sensor circuit board 304 are disposed so as to connect with the terminals of the respective printed media 201. The input device 10 has a rear surface which is similarly provided with the double-sided tape 303 and the terminals of the touch sensor circuit board 304.

Figure 7:
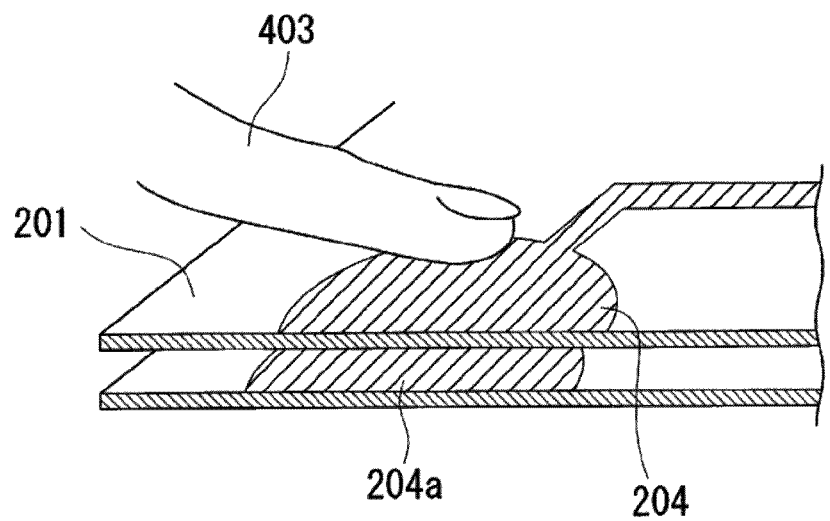
FIG. 7 is a perspective view illustrating a relationship between selected-area detection electrodes respectively provided to an open page and the adjacent page.

FIG. 7 is a perspective view illustrating a relationship between selected-area detection electrodes respectively provided to an opened page and the adjacent page. In general, the capacitance sensor circuit 811 repeatedly charges and discharges the electrodes to evaluate the characteristics change. As shown in FIG. 7, when a selected-area detection electrode 204 of a page is disposed so as to overlap with a selected-area detection electrode 204a of a second page, the selected-area detection electrode 204a of the second page is also subjected to the repeated charge and discharge of the capacitance sensor circuit 811. As in the case of the selected-area detection electrodes 204 and 204a which are parallel disposed in a very small distance, application of electric charge to the selected-area detection electrodes 204a may greatly affect the selected-area detection electrodes 204 whose capacitance is desired to be measured. Thus, it is difficult to accurately detect the capacitance. In this regard, based on the detection of a viewed page, electrical connection of the selected-area detection electrodes 204a of other pages is temporarily interrupted from the capacitance sensor circuit 811 to improve detection accuracy of the capacitance sensor circuit 811 (second determination unit) that determines whether the viewed page has been touched by the user. The capacitance sensor circuit 811 may be connected to electrodes on a page basis to switch the operation by the capacitance sensor circuit 811, or the capacitance sensor circuit 811 may be disconnected from electrodes on an electrode basis by use of a switch, such as an analog switch, a bidirectional multiplexer, or a relay. In the absence of a full contact of the user's finger with the selected-area detection electrode 204, the user's touch thereon may be determined to have occurred based on the capacitance change due to the approach of the user's finger 403 thereto.

Figure 8:
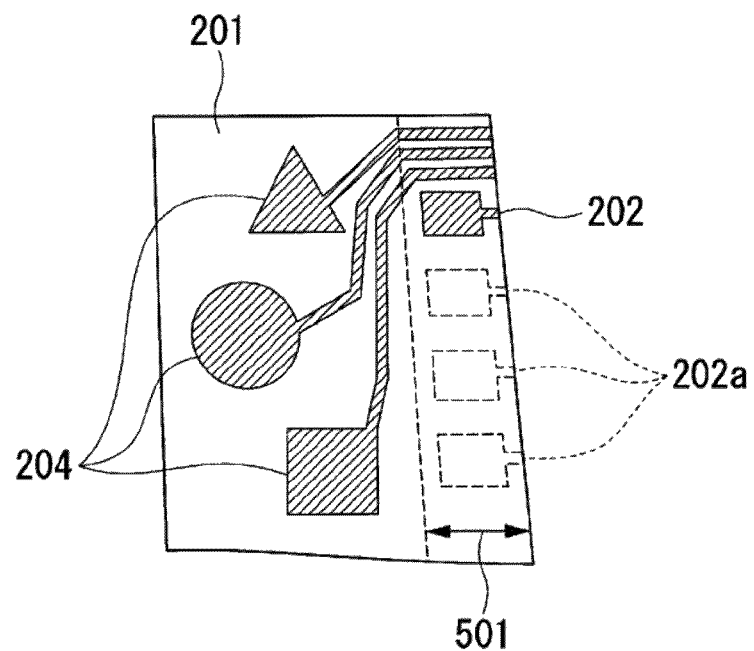
FIG. 8 is a plan view illustrating an example of electrodes disposed to a printed medium of an input device 10.

FIG. 8 is a plan view illustrating an example of electrodes disposed to a printed medium of the input device 10.

When there is a printed medium 201 for a page and there is a viewed-page detection electrode 202, viewed-page detection electrodes of other pages are disposed so as not to overlap with each other, just as the viewed-page detection electrodes 202a shown in FIG. 8. All the viewed-page detection electrodes are disposed in an area 501 of the printed medium 201 close to the spine (disposed to the spine side), while the selected-area detection electrodes 204 for selecting an area are disposed outside the area 501. Thus, interference is prevented between the viewed-page detection electrodes 202 and the selected-area detection electrodes 204 when they are evaluated by the capacitance sensor circuit 811.

Figure 9:
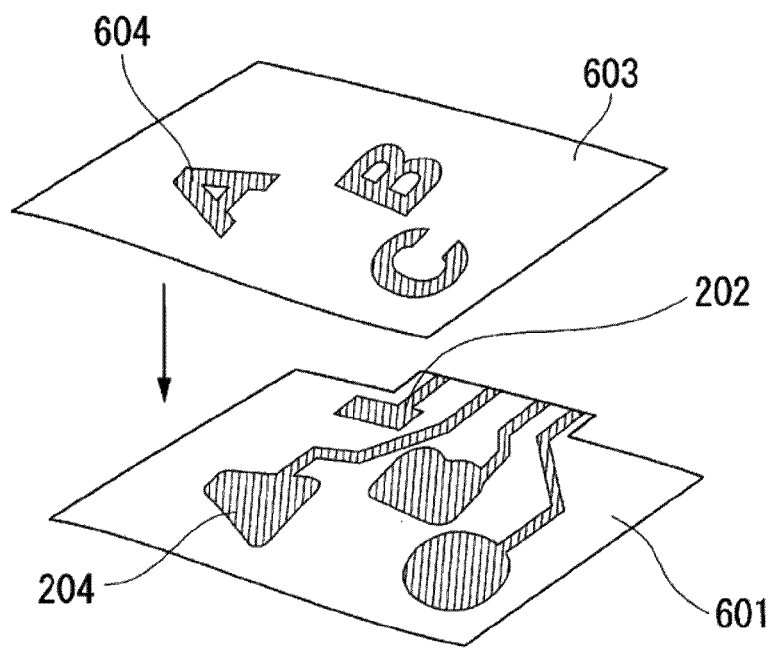
FIG. 9 is a perspective view illustrating an example of bonding a printed medium on which content is printed to a printed medium on which electrodes are printed.

FIG. 9 is a perspective view illustrating an example of bonding a printed medium on which content is printed to a printed medium on which electrodes are printed.

A viewed-page detection electrode 202 and selected-area detection electrodes 204 are disposed to a printed medium which is a sheet-like substrate 601 having electrode patterns. On the substrate 601, a printed medium, i.e. a sheet of paper or a film 603 with a design 604 being printed, is bonded.

Thus, the printed medium of the printed matter on which content is printed is configured as shown in FIG. 9 to conceal the electrodes without impairing designability.

Figure 10:
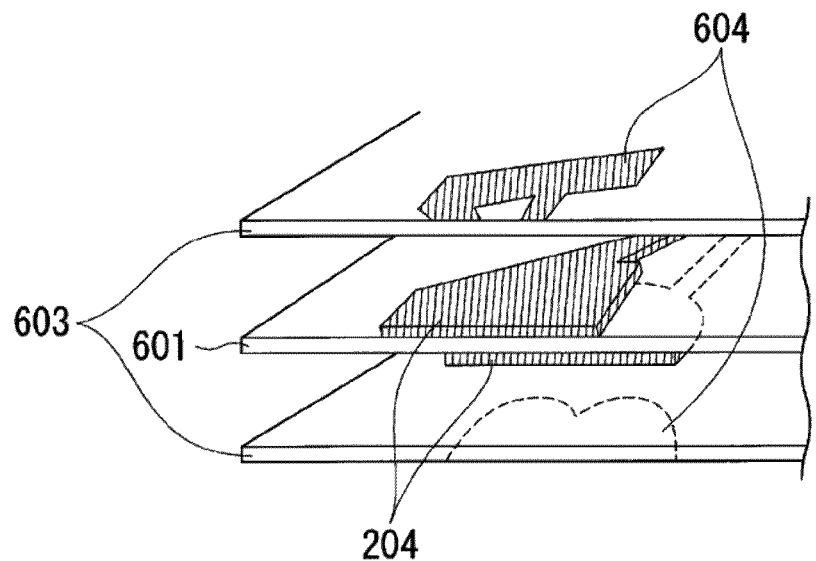
FIG. 10 is a perspective view illustrating a cross sectional structure of the printed media shown in FIG. 9, i.e. the printed medium on which electrodes are printed and the printed medium on which content is printed.

FIG. 10 is a perspective view illustrating a cross sectional structure of the printed media shown in FIG. 9 i.e. the printed medium on which electrodes are printed and the printed medium on which content is printed. The printed medium that is the sheet-like substrate 601 having electrode patterns has upper and lower surfaces that serve as first primary surfaces. On the upper and lower surfaces, respective printed media are bonded, each being the sheet of paper or the film 603 on which the design 604, or content, is printed. The substrate 601 may be inkjet paper in which a conductive ink layer is shared between the upper and lower surfaces, with neither side serving as a first primary surface. In this case, the electrode patterns may be in a matrix so that the user's touch on either the upper or lower surface can be detected.

The capacitance sensor circuit 811 detects a viewed page by evaluating the capacitance change of the viewed-page detection electrode 202.

Figure 11:
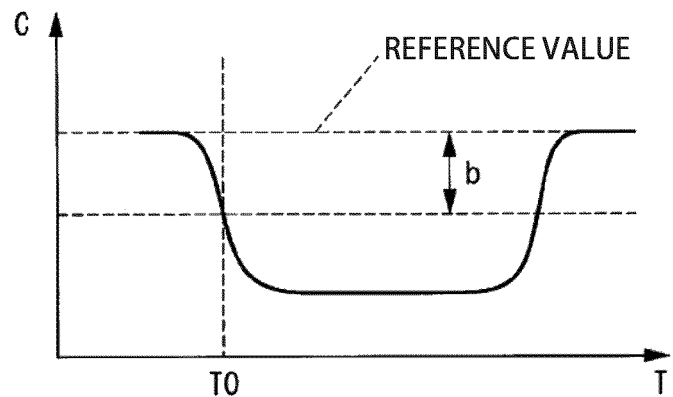
FIG. 11 is a timing diagram illustrating a method of detecting a viewed page by using a capacitance sensor circuit 811 (first determination unit).

FIG. 11 is a timing diagram illustrating a method of detecting a viewed page by using the capacitance sensor circuit 811 (first determination unit). In FIG. 11, the vertical axis represents a capacitance C, and the horizontal axis represents time T. As shown in FIG. 11, the capacitance sensor circuit 811 determines which page of the printed media has been opened when the capacitance of the viewed-page detection electrode 202 decreases below a reference value and then falls below a value that is lower by a threshold b than the reference value (reference value-b).

In the timing diagram, the time when a capacitance C of the viewed-page detection electrode 202 falls below the value that is lower by the threshold b than the reference value (reference value-b) is taken to be time T0 when a viewed page is opened.

The reference value may vary as the input device 10 is continued to be used, due to page deformation, electrode deterioration, or the like. When the user is in the state of not holding the input device 10, the input device 10 is considered to be in an inactive state, with all the pages of the printed medium being closed. While the input device 10 is in such an inactive state, acceleration measured by the acceleration sensor 813 of the input device 10 is 0. In this case, the reference value is updated based on an average of the reference values at the time of the acceleration being 0 to accurately calculate the reference value and improve reliability of detecting a viewed page. The reference value is calculated by the microcomputer 814.

The capacitance sensor circuit 811 detects a selected area of a viewed page by evaluating the capacitance change of the selected-area detection electrode 204.

Figure 12:
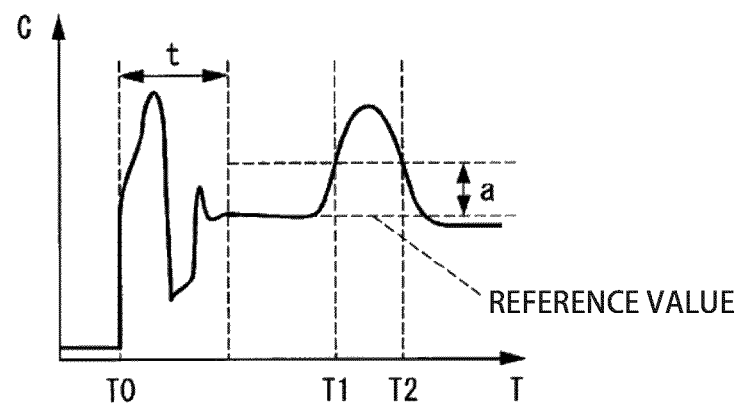
FIG. 12 is a timing diagram illustrating a method of detecting a selected area of a viewed page by using a capacitance sensor circuit 811 (second determination unit).

FIG. 12 is a timing diagram illustrating a method of detecting a selected area of a viewed page by using the capacitance sensor circuit 811 (second determination unit). In FIG. 12, the vertical axis represents a capacitance C, and the horizontal axis represents time T. As shown in FIG. 12, when a page is opened at time T0, the first determination unit carries out viewed-page detection to determine the currently viewed page.

Immediately after the opening of the page, the capacitance of the selected-area detection electrode 204 is disturbed. Therefore, the processing halts for a predetermined suspension time period t. Then, the capacitance C of each selected-area detection electrode 204 is retained as a reference value at time (T0+t). When the capacitance C of the selected-area detection electrode 204 increases above a preset threshold by a high value a (reference value+a) compared to this reference value (time T1), it is determined that the selected-area detection electrode 204 has been touched by the user. When the capacitance C of the selected-area detection electrode 204 decreases below the preset threshold by the high value a (reference value+a) compared to this reference value (time T2), it is determined that the user's touch on the selected-area detection electrode 204 has been released.

Figure 13:
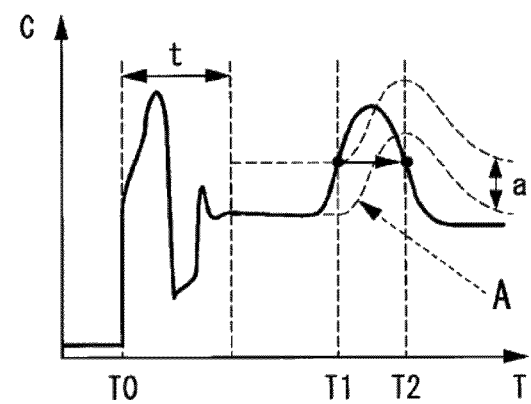
FIG. 13 is a timing diagram illustrating another method of detecting a selected area of a viewed page by using a capacitance sensor circuit 811 (second determination unit).

FIG. 13 is a timing diagram illustrating another method of detecting a selected area of a viewed page by using the capacitance sensor circuit 811 (second determination unit). In FIG. 13, the vertical axis represents a capacitance C, and the horizontal axis represents time T. Immediately after the opening of a page, the capacitance of the selected-area detection electrode 204 is disturbed. Therefore, the processing halts for a predetermined suspension time period t. Then, a moving average of the capacitance C of each selected-area detection electrode 204 is retained as a reference value at time (T0+t). When the capacitance C of the selected-area detection electrode 204 increases above the preset threshold by the high value a (reference value+a) compared to this reference value (time T2), it is determined that the selected-area detection electrode 204 has been touched by the user.

In such a detection method, a selected area on a viewed page is detected using the moving average value A of the capacitance as a reference value, without fixing a reference value as described referring to FIG. 12.

Use of this method can reduce the influence of temperature and other environmental changes on the detection.

In this way, the capacitance sensor circuit 811 (second determination unit) detects the selected-area detection electrode 204 that has been selected to thereby detect the page and the area touched by the user, and outputs the detection result to the communication circuit 812 as selected-area identification information.

The printed matter (120) thus includes: a viewed-page detection electrode (202) that is provided to a first primary surface of a printed medium among a plurality of printed media (201) bound as printed matter, and disposed such that, in a closed state of the printed matter, at least part of the electrode provided to the page of the printed medium overlaps with an electrode (203) provided to a page of a printed medium facing the page of the former printed medium; a selected-area detection electrode (204) that is provided to the first primary surface at a position different from that of the viewed-page detection electrode (202); a first determination unit (capacitance sensor circuit 811) that is connected to the viewed-page detection electrodes (202, 203), and determines which page of the printed media has been opened, based on capacitance generated in the viewed-page detection electrode; and a second determination unit (capacitance sensor circuit 811) that is connected to the selected-area detection electrode (204), and determines whether a selected-area detection electrode in an open page of the printed matter has been touched by the user, based on capacitance generated in the selected-area detection electrode in a state where the printed matter is open.

According to the embodiment described above, the page number of a printed medium viewed by the user and the operation of selecting a specific area can be detected using a capacitance sensor, without impairing the designability inherent in the printed medium. The receiving device 20 transmits a signal to the input device 10 querying as to information transmission and receives radio waves transmitted from a communication circuit of the input device 10 in reply to the query. The information management device 30 outputs content to the information output device 40. The content corresponds to the page identification information of the radio waves received by the receiving device 20. The information output device 40 displays the content outputted from the information management device 30 on a screen or audibly outputs the content. Thus, in the information output device 40, the information corresponding to the open page of the printed matter 120 is outputted.

Figure 14:
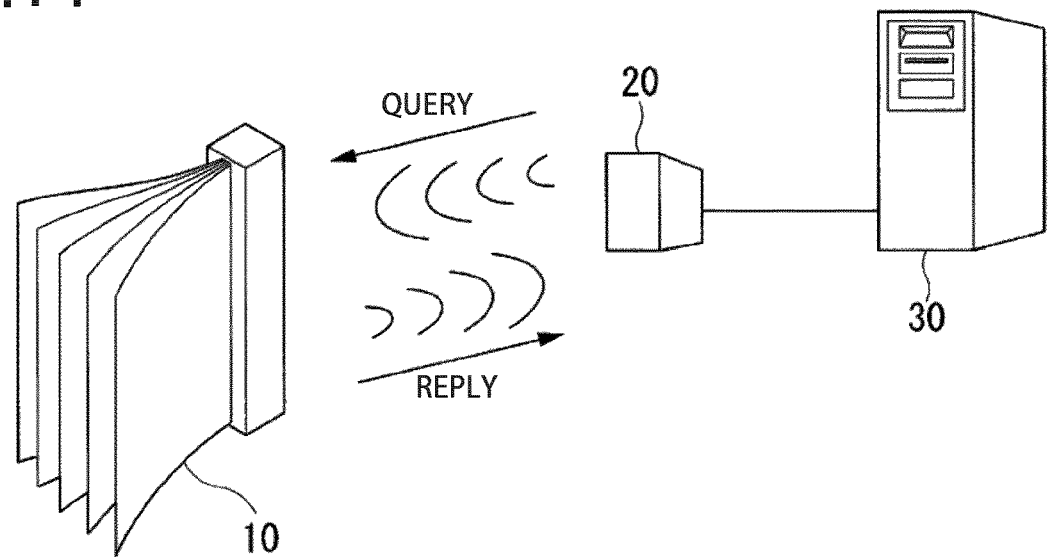
FIG. 14 is a conceptual diagram illustrating a relationship between an input device 10 and a receiving device 20.

FIG. 14 is a conceptual diagram illustrating a relationship between the input device 10 and the receiving device 20. Within a range where communication can be established between the input device 10 and the receiving device 20, the user operates the input device 10 to open the user's desired page. When the input device 10 receives a query signal from the receiving device 20 within a range of establishing communication therewith, the individual identification information stored in the microcomputer 814 of the input device 10, for example, is sent in reply (transmitted) to the receiving device 20 from the communication circuit 812. In this case, the receiving device 20 can identify the input device 10 and the page that is currently opened or closed, based on the individual identification information received from the input device 10 and the page identification information received with the identification information.

Figure 15:
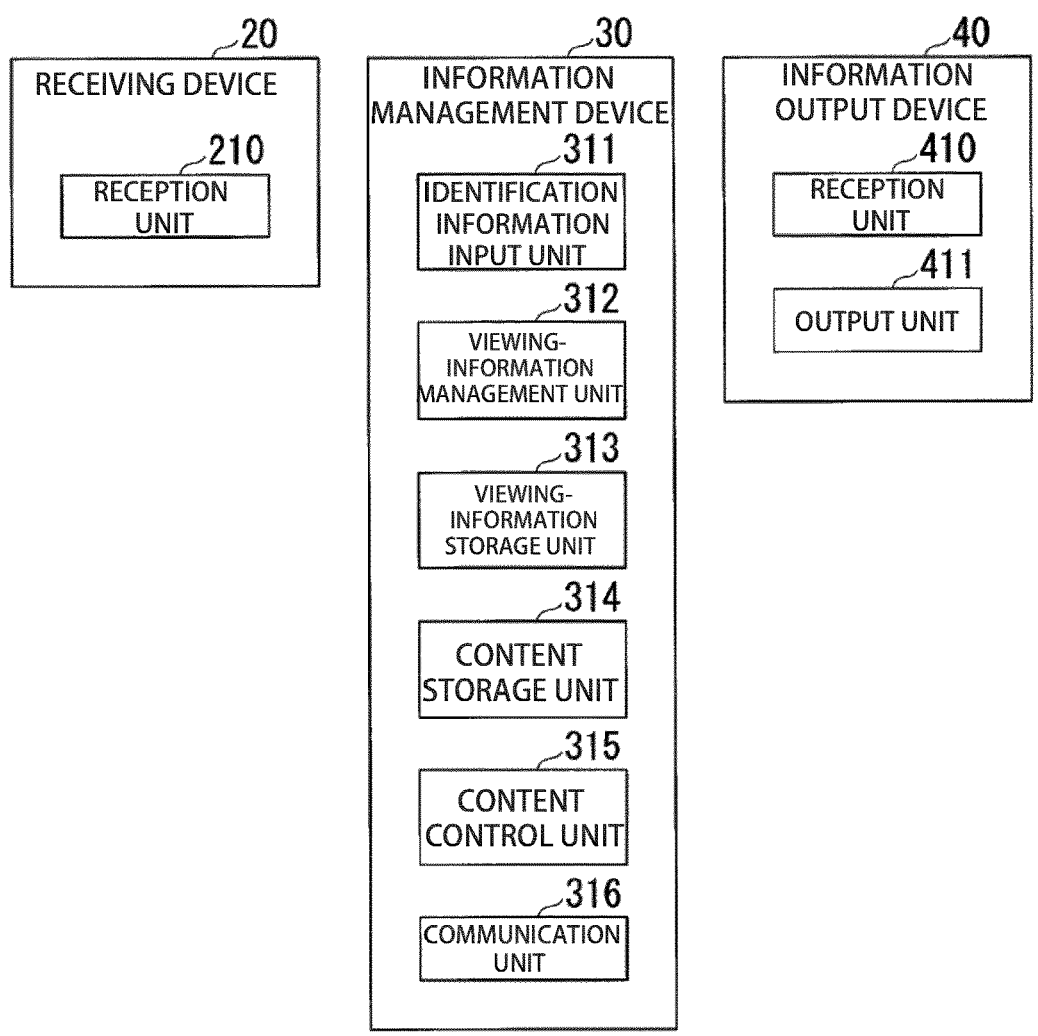
FIG. 15 is a schematic functional block diagram illustrating functions of a receiving device 20, an information management device 30, and an information output device 40.

FIG. 15 is a schematic functional block diagram illustrating functions of the receiving device 20, the information management device 30, and the information output device 40.

The receiving device 20 includes a reception unit 210. The reception unit 210 receives radio waves transmitted via the communication circuit 812 of the printed matter 120, and outputs the radio waves to the information management device 30 as a reception signal. The reception unit 210 also has a function of receiving radio waves transmitted from a plurality of items of printed matter 120. The information management device 30 includes an identification information input unit 311, a viewing-information management unit 312, a viewing-information storage unit 313, content storage unit 314, content control unit 315, and a communication unit 316.

The identification information input unit 311 acquires page identification information corresponding to the open page of the printed matter based on the signal received from the receiving device 20. The identification information input unit 311 may receive a plurality of reception signals from the receiving device 20 that has received reception signals from a plurality of different items of printed matter. In this case, the identification information input unit 311 acquires respective pieces of page identification information, based on the reception signals. The identification information input unit 311 also acquires individual identification information included in the reception signal. The viewing-information management unit 312 associates the individual identification information and the page identification information acquired by the identification information input unit 311 with the time of acquiring the page identification information (or the time of receiving the signal from the receiving device 20), for storage in the viewing-information storage unit 313. The viewing-information management unit 312 is configured to have a clock function to provide the current time. The viewing-information storage unit 313 stores the information outputted from the viewing-information management unit 312. For example, the viewing-information storage unit 313 associates individual identification information, page identification information, and time with one another and stores the associated information. The content storage unit 314 stores content, such as images (still or moving images) or sounds. The content control unit 315 uses, as a basis, the individual identification information, the page identification information, and the time acquired by the viewing-information management unit 312 to read content corresponding to these pieces of information from the content storage unit 314, for transmission to the information output device 40 via the communication unit 316. The communication unit 316 communicates with the receiving device 20 and the information output device 40 to transmit/receive various pieces of information.

The information output device 40 includes a reception unit 410 and an output unit 411 (content output unit).

The reception unit 410 receives content outputted from the information management device 30.

The output unit 411 has a display screen, a speaker, and the like, and displays an image on the display screen or outputs sounds from the speaker, regarding the content received by the reception unit 410.

FIG. 16 is a diagram illustrating an example of content stored in the content storage unit 314.

The content refers to the information in which the viewing information (information identifying the open page of the printed matter and the area selected by a touch) is associated with the content. For example, if the viewing information is N1, the information N1 indicates that the page currently viewed is the first page, which is yet to be touched by the user, and indicates association with content A. Such information is stored in the content storage unit 314 for each piece of individual identification information.

Figure 17:
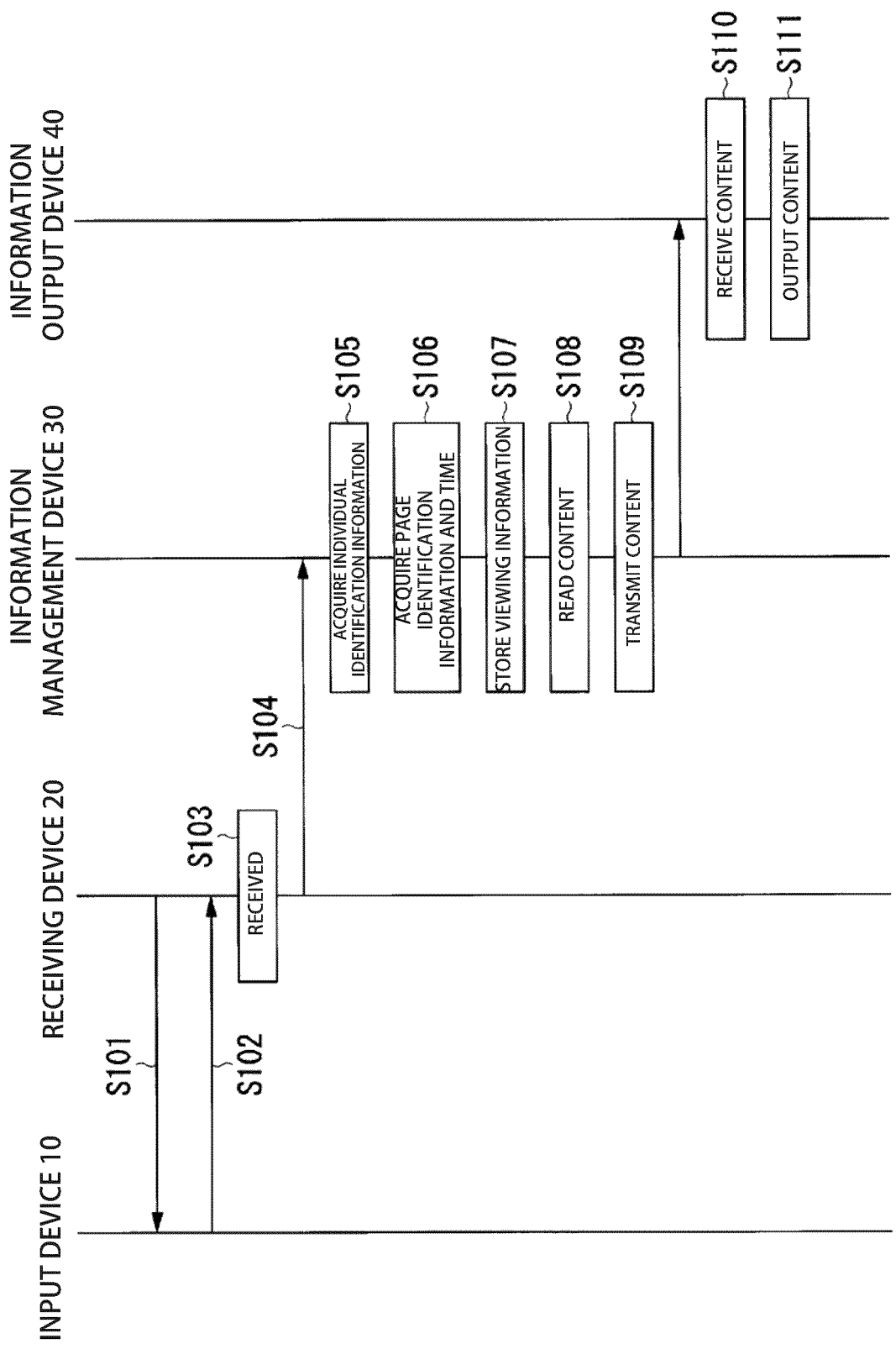
FIG. 17 is a sequence diagram illustrating operation of an information output system 1.

FIG. 17 is a sequence diagram illustrating operation of the information output system 1.

When viewing a print surface of the input device 10, the user brings the input device 10 within a range of establishing communication with the receiving device 20. The receiving device 20 transmits query information to an IC chip 110 (step S101). The query information is cyclically transmitted. Upon receiving the query information from the receiving device 20, the input device 10 transmits reply information that contains identification information included in the IC chip 110 in reply to the query information (step S102). Upon receiving the reply information (step S103), the receiving device 20 transmits the received reply information to the information management device 30 (step S104). The information management device 30 acquires individual identification information and page identification information from the received reply information, and then acquires the time of receiving the reply information (steps S105, S106). Then, the information management device 30 stores the acquired individual identification information, page identification information, and time, as viewing information (step S107). Then, the information management device 30 reads content corresponding to the individual identification information, the page identification information and the time from the content storage unit 314 (step 108), and transmits the read content to the information output device 40 (step S109). Upon receiving the content from the information management device 30 (step S110), the information output device 40 outputs the content by displaying it on the display screen or audibly outputting it from the speaker (step S111).

According to the embodiment described above, opening or closing of any page of the input device 10 triggers an output of the content corresponding to the open page. Thus, the user can perceive both the information printed on the printed matter and the outputted content.

The printed matter 120 may be used as a user interface, and the user may operate the software on the information management device 30. This means that, in addition to the output of the content, the software on the information management device 30 may be implemented according to the open page, or a command corresponding to a function on the software may be inputted. For example, this may be achieved by providing a storage unit and a control unit to the information management device 30. The storage unit may store page identification information and processes to be executed. The control unit may read the process corresponding to the page identification information acquired from the storage unit and execute the read process.

According to the embodiment described, the user can intuitively operate software on the computer by carrying out a general operation of viewing a printed medium, without a special operation of causing the computer to recognize the printed medium.

According to the embodiment described above, the user can carry out an operation such as of acquiring additional information related to the item, by touching an electrode disposed to a specific area of the page.

The embodiment described above is accomplished without impairing designability of a bookbound printed medium. In addition, since the computer is wirelessly and simultaneously linked to a plurality of printed media, the present system can be used in a wide range of application.

Figure 18:
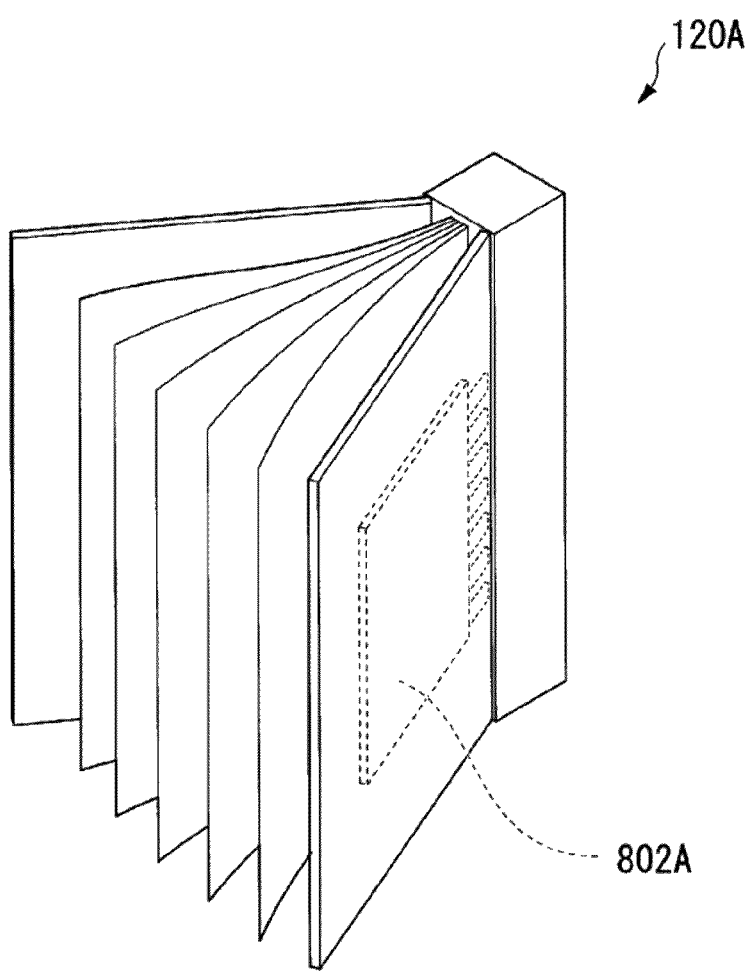
FIG. 18 is a schematic perspective view illustrating an appearance of printed matter 120A.

According to the embodiment described above, as shown in FIG. 3 or 4, the electronic circuit part 802 is provided to the spine of the printed matter 120. FIG. 18 is a schematic perspective view illustrating an appearance of a printed matter 120A. The printed matter 120A may be partially provided with an electronic circuit part 802A. For example, as shown in FIG. 18, the electronic circuit part 802A may be installed in the front or rear of a hard cover.

Figure 19:
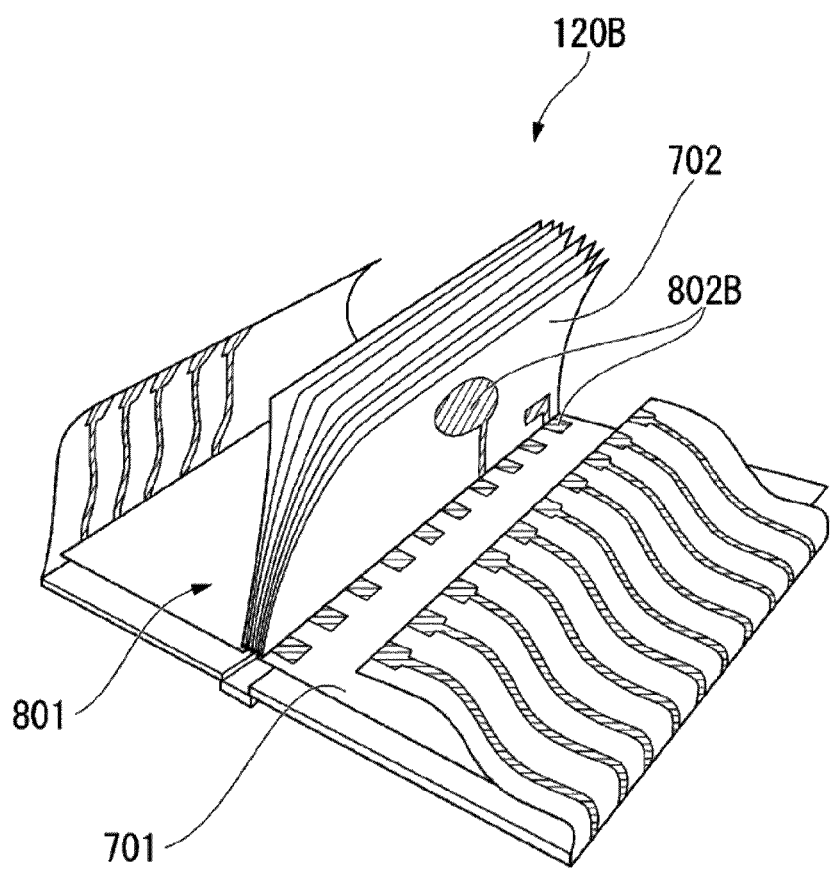
FIG. 19 is a schematic perspective view illustrating an appearance of printed matter 120B.

FIG. 19 is a schematic perspective view illustrating an appearance of a printed matter 120B. As another mode, an electronic circuit part 802B may be a sticker electrode that can be attached to a predetermined area. For example, in FIG. 19, the first determination unit connected to the viewed-page detection electrode is provided near the binder part for adding a hard cover (exterior) 701 to the booklet part 801, while the second determination unit connected to the selected-area detection electrode is provided to a plurality of printed media 702. The sticker electrode may be formed, for example, by conductive ink printing. Thus, the booklet part 801 can be separated from the electronic circuit part 802B which includes the first and second determination units.

Figure 20A:
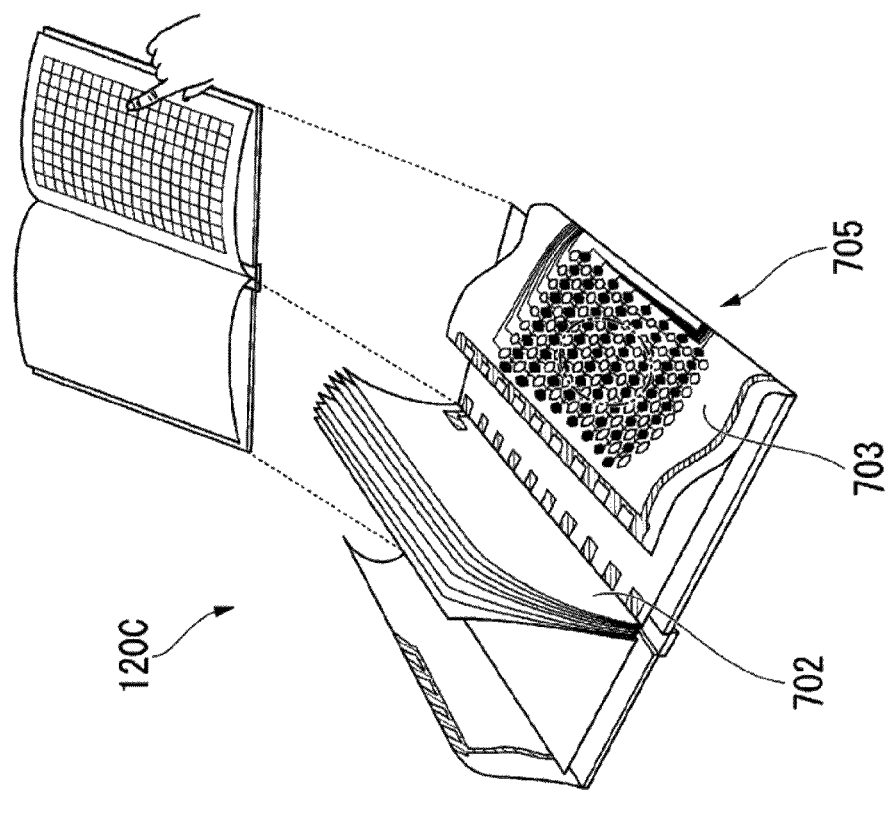
FIGS. 20A and 20B are a set of diagrams including a schematic perspective view of an appearance of printed matter 120C.
Figure 20B:
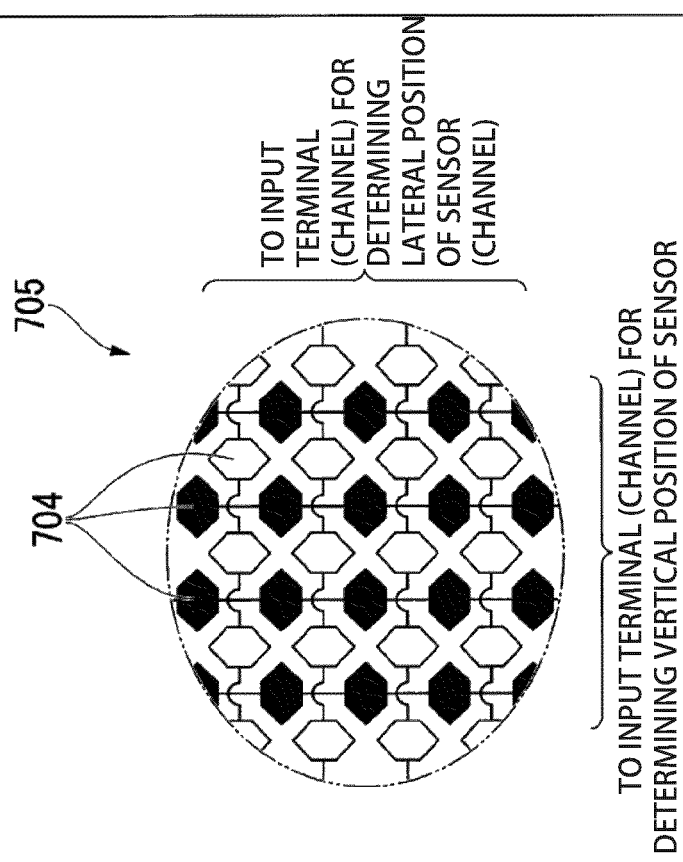

FIGS. 20A and 20B are a set of diagrams including a schematic perspective view of an appearance of printed matter 120C. The printed matter 120C makes use of the characteristics that a capacitance change can be detected over a page. As shown in FIG. 20A, a wiring structure 705, in which an electrode 704 is disposed in a grid form, is provided to a rear surface of a book cover 703 (or a rear surface of the booklet part) to detect a selected area of each page. This means that the second determination unit connected to the selected-area detection electrode is provided to the rear surface of the book cover 703 (or the rear surface of the booklet part).

As shown in FIG. 20B, rows and columns of electrode segments are closely disposed in the configuration pattern of the grid electrode 704 to enable area selection as is done on a touch panel. For example, a position on the XY plane can be detected from a relationship of the row and column numbers with the capacitance intensity. For example, the wiring of each row may be connected to an input terminal for determining a lateral position of the sensor, and the wiring of each column may be connected to an input terminal for determining a vertical position of the sensor. The wiring of the grid electrode 704 may be provided to the book cover 703 by conductive ink printing or the like.

This eliminates the need for disposing selected-area determination electrodes so as not to overlap with each other across the pages. Thus, the degree of freedom is enhanced in terms of the positions of the selectable areas.

As a matter of course, the second determination unit in the form of a grid electrode may be provided in a plurality of printed media 702, instead of the configuration described above.

The information management device 30 in the embodiment described above may be embodied by a computer. In this case, a program that achieves this function may be recorded on a computer-readable recording medium so that the computer system can read and run the program recorded on the recording medium. The computer system herein refers to one that includes an operating system (OS) and hardware such as peripheral devices. The computer-readable recording medium refers to a storage device such as a flexible disk, a magneto optical disk, a ROM, a portable medium such as a CD-ROM, or a hard disk incorporated in a computer system. The computer-readable recording medium may include a medium that dynamically retains a program in a short period of time, such as a communication line that transmits a program through a network such as the internet or a telecommunication line such as a telephone line, or a medium that retains the program for a given period of time in that case, such as a volatile memory of a computer system that serves as a server or a client. The above program may be one that implements part of the function described above, or may be one that implements the function in combination with a program recorded in advance in a computer system, or may be one that implements the function by use of a programmable logic device such as a field programmable gate array (FPGA).

The embodiments of the present invention have been specifically described so far with reference to the drawings. However, the specific configurations should not be limited to these embodiments but should include designs within the scope not departing from the spirit of the invention.

REFERENCE SIGNS LIST

1 . . . Information output system; 10 . . . Input device; 20 . . . Receiving device; 30 . . . Information management device; 40 . . . Information output device; 120, 120A, 120B, 120C . . . Printed matter; 201, 601, 603, 702 . . . Printed medium; 202, 202a, 203 . . . Viewed-page detection electrode; 204, 204a . . . Selected-area detection electrode; 311 . . . Identification information input unit; 312 . . . Viewing-information management unit; 313 . . . Viewing-information storage unit; 314 . . . Content storage unit; 315 . . . Content control unit; 316 . . . Communication unit; 801 . . . Booklet part; 802, 802B . . . Electronic circuit; 811 . . . Capacitance sensor circuit; 812 . . . Communication circuit; 813 . . . Acceleration sensor; 814 . . . Microcomputer; 815 . . . Battery.

What is claimed is:

1. A booklet, comprising:
a plurality of pages;
each page of said plurality of pages comprises a viewed-page detection electrode and a selected-area detection electrode; and
a capacitance sensor circuit,
wherein the viewed-page detection electrode of each page of said plurality of pages overlaps with the viewed-page detection electrode of an adjacent page of said plurality of pages;
wherein for each page of said plurality of pages, the selected-area detection electrode is provided on the page in a position different from that of the viewed-page detection electrode,
wherein neither of the viewed-page detection electrode and the selected-area detection electrode extends outside of the respective page of said plurality of pages;
wherein each of the viewed-page detection electrode and the selected-area detection electrode of each page of said plurality of pages is connected to the capacitance sensor circuit;
wherein the capacitance sensor circuit determines a page among said plurality of pages as an open page based on a capacitance change of the viewed-page detection electrode of the page; and
wherein the capacitance sensor circuit determines the selected-area detection electrode of the page determined as the open page has been touched by a user based on a capacitance change of the selected-area detection electrode of the page.

2. The booklet of claim 1, wherein at least either of the viewed-page detection electrode and the selected-area detection electrode is formed by printing.

3. The booklet of claim 1, wherein, in a state where the booklet has been closed, the viewed-page detection electrode of a first page of the plurality of pages is disposed so as not to overlap with the viewed-page detection electrode of a third page of the plurality of pages, the third page of the plurality of pages not facing the first page of the plurality of pages.

4. The booklet of claim 1, wherein printed content is bonded to at least part of the selected-area detection electrode.

5. The booklet of claim 1, wherein the plurality of pages can be separated from the capacitance sensor circuit.

6. The booklet of claim 1, wherein the capacitance sensor circuit comprises a sticker electrode bonded to an exterior of the plurality of pages.

7. The booklet of claim 1, further comprising a cover sheet and wherein the capacitance sensor circuit comprises a grid electrode provided to a rear surface of the cover sheet or to the plurality of pages.

8. The booklet of claim 1, wherein the plurality of pages comprises a spine formed by a first edge of each page of said plurality of pages; each of the viewed-page detection electrode and the selected-area detection electrode of each page of said plurality of pages extends to the first edge of the page; and wherein the capacitor sensor circuit is mounted to the spine of the plurality of pages.

9. A method of identifying a page of a booklet, wherein the booklet comprises:

a plurality of pages;

each page of said plurality of pages comprises a viewed-page detection electrode and a selected-area detection electrode; and a capacitance sensor circuit, the viewed-page detection electrode of each page of said plurality of pages overlaps with the viewed-page detection electrode of an adjacent page of said plurality of pages;

for each page of said plurality of pages, the selected-area detection electrode is provided on the page in a position different from that of the viewed-page detection electrode, neither of the viewed-page detection electrode and the selected-area detection electrode extends outside of the respective page of said plurality of pages; and each of the viewed-page detection electrode and the selected-area detection electrode of each page of said plurality of pages is connected to the capacitance sensor circuit; the method comprises:

determining a page among said plurality of pages as an open page based on a capacitance change of the viewed-page detection electrode of the page detected by the capacitance sensor circuit; and determining that the selected-area detection electrode of the page determined as the open page has been touched by a user based on a capacitance change of the selected-area detection electrode of the page detected by the capacitance sensor circuit.

* * * * *